(12) United States Patent
Duponchel et al.

(10) Patent No.: US 8,187,493 B2
(45) Date of Patent: May 29, 2012

(54) PDLC FILMS

(75) Inventors: Benoît Duponchel, Warhem (FR);
Abdelaziz Elass, Mons en Baroeul (FR);
Mourad Boussoualem, Dunkerque (FR); Jean-Marc Buisine, Louvil (FR);
Joël DeConinck, Hyon (BE); Valérie Céline Ledauphin, Cysoing (FR);
Mickaël Coquelet, Trith Saint Léger (FR); Alexandre Vaillant, Wasquehal (FR)

(73) Assignees: Université de Mons, Mons (BE);
Université du Litteral Côte Opale, Dunkerque (FR)

( * ) Notice: Subject to any disclaimer, the term of this patent is extended or adjusted under 35 U.S.C. 154(b) by 254 days.

(21) Appl. No.: 12/296,467

(22) PCT Filed: May 5, 2006

(86) PCT No.: PCT/EP2006/004231
§ 371 (c)(1),
(2), (4) Date: Nov. 23, 2009

(87) PCT Pub. No.: WO2007/118492
PCT Pub. Date: Oct. 25, 2007

(65) Prior Publication Data
US 2010/0060826 A1 Mar. 11, 2010

(30) Foreign Application Priority Data
Apr. 13, 2006 (EP) .................................. 06290631

(51) Int. Cl.
C09K 19/52 (2006.01)
C09K 19/54 (2006.01)
G02F 1/1334 (2006.01)
C08F 20/54 (2006.01)
C08F 265/06 (2006.01)
C08F 265/10 (2006.01)

(52) U.S. Cl. .................... 252/299.1; 252/299.5; 349/86; 349/88; 525/282; 525/296; 526/307.1; 526/307.5; 526/307.6

(58) Field of Classification Search .................... 714/44; 252/299.01, 299.67, 299.5; 349/86, 88; 525/282, 525/296; 526/307.1, 307.5, 307.6
See application file for complete search history.

(56) References Cited

U.S. PATENT DOCUMENTS

| 4,246,089 A | 1/1981 | Hazan |
| 5,635,554 A | 6/1997 | Boeckh et al. |
| 6,319,424 B1 | 11/2001 | Park et al. |
| 6,697,969 B1 * | 2/2004 | Merriam ........................ 714/46 |

(Continued)

FOREIGN PATENT DOCUMENTS
EP 0 692 520 1/1996
(Continued)

OTHER PUBLICATIONS
International Search Report dated Mar. 28, 2007.

Primary Examiner — Shean Wu
(74) Attorney, Agent, or Firm — Knobbe, Martens, Olson & Bear, LLP

(57) ABSTRACT

A grafted polymer and its use in polymer/liquid crystal composite films, and more particularly in PDLC films, is disclosed. The grafted polymer includes (alkyl)acrylic acid or (alkyl)acrylamide moieties. At least one of the moieties is grafted with an alkylphenol or with an alkoxylated alkylphenol.

28 Claims, 1 Drawing Sheet acrylic methacrylic acryloyl chloride methacryloyl cloride amide

U.S. PATENT DOCUMENTS

| | | | |
|---|---|---|---|
| 6,745,151 B2 * | 6/2004 | Marko et al. | 702/182 |
| 6,813,733 B1 * | 11/2004 | Li et al. | 714/47 |
| 6,816,760 B1 * | 11/2004 | Namaky | 701/29 |
| 6,983,200 B2 * | 1/2006 | Bodin et al. | 701/33 |
| 7,093,169 B2 * | 8/2006 | Merriam | 714/47 |
| 7,231,549 B1 * | 6/2007 | Rhea et al. | 714/25 |
| 7,305,289 B2 * | 12/2007 | Gessner et al. | 701/33 |
| 7,308,492 B2 * | 12/2007 | Konopka et al. | 709/221 |
| 7,729,879 B2 * | 6/2010 | Haggar et al. | 702/122 |
| 2005/0144507 A1 * | 6/2005 | Lee et al. | 714/4 |
| 2009/0182533 A1 * | 7/2009 | Neuenschwander et al. | 702/185 |

FOREIGN PATENT DOCUMENTS

| | | |
|---|---|---|
| GB | 1 314 534 | 4/1973 |
| JP | 05-196815 | 8/1993 |
| JP | 07-331163 | 12/1995 |
| JP | 09 067508 | 3/1997 |
| JP | 2006-018065 | 1/2006 |
| WO | WO 96/37101 | 11/1996 |

* cited by examiner acrylic methacrylic acryloyl chloride methacryloyl cloride amide

PDLC FILMS

CROSS-REFERENCE TO RELATED APPLICATIONS

This application is the U.S. National Phase under 35 U.S.C. §371 of International Application PCT/EP2006/004231, filed May 5, 2006, which claims priority to EP 06290631.8, filed Apr. 13, 2006.

FIELD OF THE INVENTION

The present invention relates to the field of polymer/liquid crystal composites films, and in particular to PDLC films (polymer dispersed liquid crystal) applied to the field of light transmission.

BACKGROUND OF THE INVENTION

Nowadays there exists an increasing interest for supports that have optical and/or energetic properties that can be controlled at will. It is particularly advantageous to be able to control the intensity of day light or the vision degree through a glazing.

In this context, some firms market glazing constituted of electrochromic materials that have the property of going from an oxidation state having a high light transmission to an oxidation state having a low light transmission.

Another widespread method in the field of so-called intelligent glazing consists in the preparation of PDLC films (polymer dispersed liquid crystal). PDLC films are composites films formed by liquid crystal droplets dispersed in a polymer matrix. Each droplet has its own orientation resulting in a global isotropic orientation and physically resulting in the PDLC film opacity. Under application of an external electric field, the liquid crystal molecules adopt a parallel orientation to the field axe and confer transparency to the PDLC film.

The electro-optical performances: transmittance, switching voltage (voltage necessary for passing from an opaque to a transparent state), the PDLC film response time . . . are limited amongst other thing, by the behavior of the liquid crystals at the polymer/liquid crystal interface. Indeed it has been noted, in certain prior art devices that the liquid crystals at the interface of the droplet orient differently from those at the center of the droplet, and are less sensitive to the application of an electric field. The droplet size also plays a role in the electro-optical properties of PDLC films. A reduced droplet size leads to an increase in anchoring and consequently in an increase in the switching voltage. On the other hand an increased droplet size is unfavorable to a minimum transmittance in the field-off state and deteriorates the contrast.

Preparation techniques of PDLC films are generally based either on phase separation methods or on emulsification methods.

Separation phase methods consist in allowing the liquid crystal to disperse in the polymeric matrix. There exists three phase separation methods: the PIPS method (polymerization induced phase separation), the TIPS method (thermally induced phase separation), and the SIPS method (solvent induced phase separation). These methods present disadvantages such as the possible presence of inhomogeneities in the polymer matrix, an irregular distribution of the liquid crystal droplets, or the instability of formed films. That is why these methods do not permit to obtain sufficient electro-optical performances for an optimal application in the field of intelligent glazing. Finally theses methods can be polluting due to the use of organic solvents and can be also costly due to the complexity of used processes.

Emulsification methods or encapsulation methods consist in using a water soluble polymer matrix. The NCAP (nematic curvilinear aligned phase) method for example, based on these encapsulation methods consists in dispersing an emulsion of liquid crystal droplets in a water soluble polymer solution. Droplets obtained by this method tend to be non-uniform in size and tend to coalesce. Park and al. for example, in U.S. Pat. Nos. 6,319,424 and 6,270,691, describe a liquid crystal emulsion stabilized by a copolymer. The copolymer is constituted of a hydrophilic monomer and of a hydrophobic monomer. The response when an external voltage is applied is not optimal in terms of transmittance.

Electro-optical properties of PDLC films greatly depend on the nature of the polymer matrix/liquid crystal interface, and improvements are still needed in this stage.

The object of the present invention is to overcome at least one of above mentioned disadvantages. The aim of the present invention is to design PDLC films with improved electro-optical performances, with an easy to implement preparation method which is non-polluting and cost effective. Another aim of the present invention is to produce a system that can be applied to large surfaces as well as non-planar surfaces, without sophisticated treatment.

SUMMARY OF THE INVENTION

To this end, the present invention provides a grafted polymer characterized in that the polymer comprises (alkyl) acrylic acid or (alkyl)acrylamide moieties wherein at least one of said moieties is grafted with an alkylphenol or with an alkoxylated alkylphenol.

The grafted polymer according to the present invention presents interfacial properties particularly suited for the preparation of liquid crystal films. In particular, the grafted polymers according to the present invention permit to obtain PDLC films having droplets of optimal size, with low polydispersity, permitting a simultaneous and homogeneous response of liquid crystal droplets under application of an external field. They also allow to reduce the amount of solvent as well as the implementation time during the preparation of PDLC films.

Yet another object of the present invention is a composition suitable for the preparation of liquid crystal composite films, said composition comprising: a liquid crystal dispersed in a grafted polymer, said grafted polymer comprising (alkyl) acrylic acid or (alkyl)acrylamide moieties wherein at least one of said moieties is grafted with an alkylphenol or with an alkoxylated alkylphenol. A further object of the present invention encompasses therefore films formed with a composition according to the present invention.

These films can be applied to all types of materials, in particular transparent materials and more particularly to glazed surfaces or plastic films. Potential applications of the present invention include but are not limited to intelligent glazing with variable opacity and direct or projection display.

Yet another object of the present invention is a liquid crystal device comprising a film according to the present invention on a substrate.

Yet another object of the present invention is an electro-optical system which, between two electrode layers, contains a PDLC film comprising one or more liquid crystals forming microdroplets in a polymer matrix, said polymer matrix comprising a grafted polymer, said grafted polymer comprising (alkyl)acrylic acid or (alkyl)acrylamide moieties wherein at least one of said moieties is grafted with an alkylphenol or with an alkoxylated alkylphenol.

Yet another object of the present invention is an electro-optical glazing as well as windows doors, and roofs comprising an electro-optical glazing according to the present invention.

Yet another object of the present invention is a method for the preparation of a product usually opaque that becomes transparent under application of an electric field, said method comprising the steps of:

dispersing at least one liquid crystal in a grafted polymer, said grafted polymer comprising (alkyl)acrylic acid or (alkyl)acrylamide moieties wherein at least one of said moieties is grafted with an alkylphenol or with an alkoxylated alkylphenol, thereby obtaining a dispersion and forming a film with said dispersion.

Other features and advantages of the present invention will become apparent on reading the description which follows and the examples illustrating it.

DETAILED DESCRIPTION OF THE INVENTION

Figure 1:
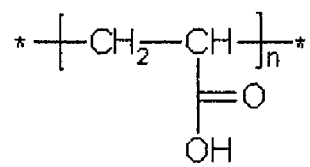
FIG. 1 represents examples of polymers that can be used in the preparation of a grafted polymer according to an embodiment of the invention.
Figure 1:
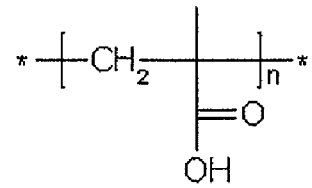
Figure 1:
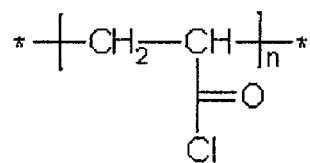
Figure 1:
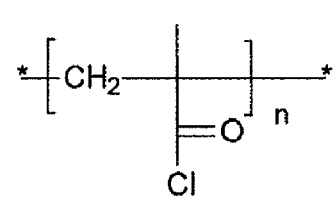
Figure 1:
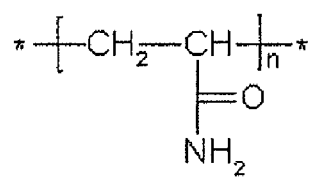

In a first aspect, the present invention describes a new polymer, wherein a surfactant is grafted to a polymer. In particular, the present invention provides a grafted polymer comprising (alkyl)acrylic acid or (alkyl)acrylamide moieties wherein at least one of said moieties is grafted with an alkylphenol or with an alkoxylated alkylphenol. The present invention also provides methods for the synthesis of said grafted polymer and methods for the preparation of a PDLC film presenting improved electro-optical properties.

Advantageously, the grafted polymer according to the present invention comprises the following moiety:

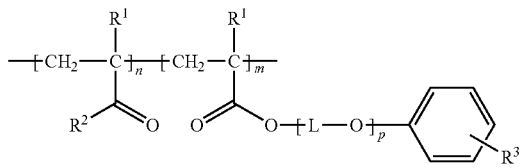

wherein:
p represents an integer equal or greater than 0, preferably between 0 and 40, preferably between 0 and 10, preferably between 0 and 5, preferably p is equal to 4,
each $R^1$, identical or different, represents a hydrogen atom or a $C_{1-4}$ alkyl group.
each $R^2$, identical or different, represents an OH or $NH_2$ group,
each $R^3$, identical or different, represents a $C_{2-180}$ alkyl group, optionally substituted with one or more $C_{1-4}$-alkyl substituents, preferably a $C_{4-50}$ alkyl, optionally substituted with one or more $C_{1-4}$-alkyl substituents, preferably a $C_{6-20}$ alkyl, optionally substituted with one or more $C_{1-4}$-alkyl substituents,
L represents a $C_{1-6}$ alkylene group, and
n and m each independently represent an integer between 0 and 3200, preferably between 1 and 1500, preferably between 1 and 650, more preferably between 1 and 150,
m+n is between 1 and 3500, preferably between 1 and 1500, preferably between 1 and 650, more preferably between 1 and 150, the ratio between m and n being between 0.01/1 and 0.1/1, preferably between 0.01/1 and 0.05/1.

In the context of the present invention, $C_{2-180}$ alkyl group refers to a linear or branched saturated hydrocarbon group joined by single carbon-carbon bonds having 2 to 180 carbon atoms. In a similar manner $C_{1-4}$ alkyl refers to a linear or branched saturated hydrocarbon group joined by single carbon-carbon bonds having 1 to 4 carbon atoms, more particularly a methyl, ethyl, propyl or 1-methylethyl.

As used herein, $C_{1-6}$ alkylene refers to a divalent linear or branched saturated hydrocarbon group having 1 to 6 carbon atom, such as methylene ($—CH_2—$), ethylene ($—CH_2CH_2—$), 1-methylethylene ($—CH(CH_3)CH_2—$), propylene ($—CH_2CH_2CH_2—$), etc.

As used herein, the term alkoxylated refers to an O-alkyl group with a linear or branched aliphatic saturated chain, such as methoxylated, ethoxylated, etc.

The term <<grafted polymer>> designates, in present description and in the corresponding claims, an (alkyl)acrylic acid polymer or (alkyl)acrylamide polymer on which are grafted surfactant molecules of the alkylphenol or alkoxylated alkylphenol family. The product obtained by the grafting on the polymer of these molecules commonly used as surfactants, has been named surfmer. The terms <<grafted polymer>>, <<surfmer>> or <<surface active polymer>> are synonymous and are used interchangeably in the present description.

As used herein, the term <<surfactant>> means a surface agent, or a surface active agent, these three terms being synonymous and being used interchangeably in the present description.

Yet another object of the present invention is a method for the synthesis of a grafted polymer according to the present invention comprising the step of: grafting at least one alkylphenol or alkoxylated alkylphenol on at least one polymer comprising (alkyl)acrylic acid or (alkyl)acrylamide moieties.

Advantageously, the alkylphenol or alkoxylated alkylphenol has the following formula:

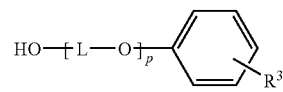

wherein
p represents an integer equal or greater than 0, preferably between 0 and 40, preferably between 0 and 10, preferably between 0 and 5, preferably p is equal to 4,
$R^3$, identical or different is a $C_{2-180}$ alkyl, preferably $C_{4-60}$ alkyl, preferably $C_{6-20}$, optionally substituted with one or more $C_{1-4}$ alkyl substituents, and
L represents a $C_{1-6}$ alkylene group.
Advantageously, the polymer has the following moiety:

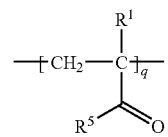

wherein
q represents an integer between 1 and 3500, preferably between 1 and 1500, preferably between 1 and 650, more preferably between 1 and 150, $R^1$, identical or different, represents a hydrogen atom or a $C_{1-4}$ alkyl group, and $R^5$, identical or different, represents a OH, Cl or $NH_2$ group.

In a particular embodiment, the polymer has a molecular weight between 250 and 250000, preferably between 250 and 50000, preferably between 250 and 10000, more preferably between 250 and 5000.

The new grafted polymer according to the present invention presents properties particularly suitable for the preparation of liquid crystal films. The grafted polymer according to the present invention, because of its structure, permits to optimize the interactions at the polymer/liquid crystal interface of a PDLC film. Indeed the surfactant grafted on the polymer, according to the present invention, has the advantage of being flexible and of having a great affinity for the liquid crystal.

Yet another object of the present invention is to provide a composition suitable for the preparation of liquid crystal films, said composition comprising: a liquid crystal dispersed in a grafted polymer, said grafted polymer comprising (alkyl)acrylic acid or (alkyl)acrylamidee moieties wherein at least one of said moieties is grafted with an alkylphenol or with an alkoxylated alkylphenol.

Preferably the grafted polymer comprises the following moiety:

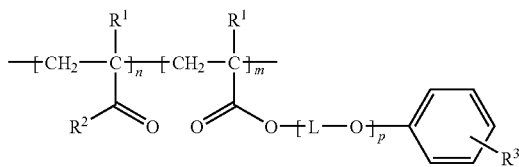

wherein p, $R^1$, $R^2$, $R^3$, L, n and m have the same meaning as that defined above.

It is important to note that the nature of the liquid crystal is not limitative. Different liquid crystals can be used in the present invention. Nematic liquid crystals are preferred. In particular, liquid crystals from the family of substituted biphenyl or triphenyl compounds are preferred such as 5CB (4-Cyano-4'-n-pentyl-1,1'-biphenyl), 7CB (4-Cyano-4'-n-heptyl-1,1'-biphenyl), 8OCB (4-Cyano-4'-n-octyloxy-1,1'-biphenyl), 5CT (4-Cyano-4"-n-pentyl-1,1'-terphenyl) or mixtures thereof such as E7 and E90 (from Merck). Pigments can also be associated to the liquid crystals for applications in the field of display for example.

Proportions of liquid crystal and of grafted polymer are expressed below in amount by weight of the composition. Advantageously, according to the present invention, the proportion of liquid crystal is from 20 to 60% by weight of composition, preferably from 20 to 40% by weight of the composition. Advantageously, according to the present invention, the proportion of grafted polymer is from 10 to 40% by weight of composition.

According to a particular embodiment, the composition according to the present invention also comprises at least one solvent and optionally at least one surfactant. Preferably, the solvent is water. Advantageously, according to the present invention, the solvent proportion is from 10 to 40% by weight of the composition. Advantageously, according to the present invention, the surfactant proportion is from 0 to 10% by weight of the composition.

In an embodiment of the present invention, the composition comprises in proportions by weight: from 30 to 50% of liquid crystal, from 20 to 40% of grafted polymer, from 20 to 40% of water and from 0 to 10% of surfactant.

The proportions of liquid crystal, grafted polymer and surfactant are also expressed bellow in proportions by total weight of dry film. In an embodiment of the present invention, the liquid crystal proportion is from 30 to 70% by total weight of dry film, preferably from 40 to 60% by total weight of dry film. In an embodiment of the present invention, the grafted polymer proportion is from 30 to 70% by total weight of dry film, preferably from 40 to 60% by total weight of dry film. In an embodiment of the present invention, the surfactant proportion is from 0 to 10% by total weight of dry film, preferably from 1 to 3% by total weight of dry film.

According to an embodiment, the addition of a surfactant permits an important decrease of the interfacial tension that essentially plays a role on the anchoring of the liquid crystals on the polymers of the present invention. Furthermore, the addition of a surfactant permits to considerably limit the coalescence kinetic of the liquid crystal droplets.

Yet another object of the present invention is a method for the preparation of an emulsion comprising the step of emulsifying a composition according to the present invention.

Several emulsification protocols can be used according to the present invention. For example in a particular embodiment, a first protocol comprises the preparation of a mixture containing the liquid crystal, the surfmer, water and the surfactant; emulsifying the mixture during an appropriate time (for example 30s) and at an appropriate rate (for example 8000 rpm), or for example during 2 min at 12000 rpm.

In another particular embodiment, a second protocol comprises: preparing a mixture containing the surfmer, water and a surfactant, allowing the mixture to rest, and than adding the liquid crystal.

In accordance with a preferred embodiment, the method for the preparation of an emulsion comprises the steps of: preparing a mixture comprising a grafted polymer according to the present invention, at least one solvent and optionally at least one surfactant, adding at least one liquid crystal to this mixture and emulsify the final mixture.

According to an embodiment of the present invention, the NCAP method, consisting in dispersing an emulsion of liquid crystal droplets in an aqueous solution of grafted polymer according to the present invention, is used. The grafted polymer according to the present invention has the advantage of being water soluble and is particularly suitable for this preparation method. This method permits to optimize parameters such as emulsification time and rate.

Accordingly, the present invention also provides emulsions obtainable by any of the above mentioned preparation methods.

The compositions and emulsions according to the present invention are particularly suitable for the preparation of films that can be applied to large surfaces as well as to non-planar surfaces, without sophisticated treatment.

The use of grafted polymers according to the present invention permits to obtain an emulsion having homogeneous liquid crystal droplets with an optimal size and of low polydispersity, resulting in a simultaneous electro-optical response under application of an external field. Preferably, the liquid crystal droplets in the polymer matrix have a size ranging from 0.1 to 5 μm, preferably from 1 to 3 μm.

The present invention also provides a film obtained using compositions according to the present invention.

According to the present invention, a PDLC film is a composite film formed by liquid crystal droplets dispersed in a polymer matrix comprising a grafted polymer according to the present invention. The polymer matrix according to the present invention permits to isolate the droplets from each other and permits to avoid their coalescence.

Thanks to its structure, the new grafted polymer according to the present invention permits to optimize the interactions at the polymer/liquid crystal interface of the PDLC film of the present invention. According to the present invention, the surfactant grafted on the polymer has the advantage of being flexible, of having a great affinity for the liquid crystal, thus permitting an improvement of the electro-optical properties of the PDLC films.

The optimal properties of the grafted polymer permit to control important parameters such as the mobility and the orientation of the liquid crystal molecules in the PDLC film. Indeed, the reduced angle variation capability between the liquid crystal and the polymer is mainly due to a phenomenon called anchoring. The higher the anchoring, the lower the liquid crystals mobility is, and the worse the electro-optical properties are. The use of a grafted polymer according to the present invention permits a minimum anchoring.

The PDLC films according to the present invention have particularly advantageous electro-optical performances. The PDLC film according to the present invention has the advantage of going from an opaque state to a transparent state under the application of an external field even if said field is small, for example under application of an external field lower than 100V, preferably lower than 50V, preferably lower than 25V, preferably lower than 10V (for a film thickness of about 10 μm). Furthermore their preparation is easy to implement, non-polluting and at low cost.

Films according to the present invention can be obtained by applying the composition or the emulsion according to the present invention on a solid support, and by drying the film on the support, preferably in an oven.

The dry PDLC films can have a thickness ranging from a few microns up to 50 μm, preferably from 1 μm to 15 μm.

The films according to the present invention have the following advantages:
 No organic solvents are used; the preparation method of the films is respectful of the environment.
 No opacifier is necessary; as the films possess improved light scattering properties.
 A small quantity of water is used. Indeed the choice of the grafted polymer presents the advantage of permitting to reduce the amount of water in the emulsion as well as the drying time of the film, and confers improved surface properties to the film (such as low roughness). Industrial productivity is increased.
 The film possesses good adhesion properties (nevertheless, this does not exclude the use of adhesion promoting agents according to the present invention).
 The invention permits to avoid complex organic synthesis steps during the preparation of PDLC films, such as those disclosed in the prior art. The process is simplified and only needs one emulsification step. No prior liquid crystal encapsulation step is needed, said prior step resulting in complicated and polluting chemical processes, as discloses in the prior art.

The present invention also provides a liquid crystal device, said device comprising a film according to invention provided on a substrate. According to an embodiment of the present invention, the device additionally comprises a second substrate, the film according to the present invention being provided between both substrates. According to an embodiment of the present invention, the device further comprises an electrode layer on each substrate, in an adjacent position to the film according to the invention.

Plastic as well as glass substrates (solid supports) can be used.

In a particular embodiment, the preparation of the liquid crystal device may comprise the steps of:

depositing an emulsion or a composition according to present invention on a conducting substrate, for example a ITO (indium tin oxide) glass or plastic plate; thereby forming a film on said substrate,
drying said film, and
depositing a second conducting substrate directly on the film formed on the first substrate.

Preferably, the drying step is performed in an oven and/or by air-drying. Drying in an oven is particularly preferred. Drying in an oven permits to stabilize the PDLC film and to avoid the migration of the liquid crystal when low molecular weight polymers are used. Samples that are dried in an oven and/or air-dried have good surface properties and an adapted roughness permitting a good adhesion of the film on the support, and the films obtained in this way have a good transmittance. Preferably drying is conducted at a temperature selected in the range of 20 to 110° C. The ideal drying temperature depends on the nature of the used polymer matrix. For example, for an emulsion prepared using 49% E7 and 49% grafted polymer obtained by grafting of NP4 on PAA (M=2000 g/mol) (see example), the drying temperature is preferably between 25 and 70° C., preferably between 40 and 60° C.

The encapsulation of liquid crystals by way of formation of droplets in the grafted polymer matrix according to the present invention (PDLC films according to the present invention) permits to prepare electro-optical systems.

The present invention also provides an electro-optical system, said system comprising a PDLC film provided between two electrode layers, said PDLC film comprising one or more liquid crystals forming microdroplets in a polymer matrix, said polymer matrix comprising a grafted polymer according to the present invention, i.e., comprising (alkyl)acrylic acid or (alkyl)acrylamide moieties wherein at least one of said moieties is grafted with an alkylphenol or with an alkoxylated alkylphenol.

In particular, the present invention provides an electro-optical glazing comprising
 a PDLC film provided between two transparent plates, said PDLC film comprising one or more liquid crystals forming microdroplets in a polymer matrix, said polymer matrix comprising a grafted polymer comprising (alkyl)acrylic acid or (alkyl)acrylamide moieties wherein at least one of said moieties is grafted with an alkylphenol or with an alkoxylated alkylphenol. According to an embodiment, the glazing further comprises an electrode layer on each plate, in an adjacent position to said PDLC film. Preferably the plates of said glazing are made of glass or plastic.

The present invention also encompasses windows comprising a glazing according to the present invention. In addition the present invention provides doors or roofs comprising a glazing according to the present invention.

The present invention further encompasses soft or rigid plastic coatings. The coatings according to the present invention comprise a PDLC film, said film comprising one or more liquid crystals forming microdroplets in a polymer matrix, said polymer matrix comprising a grafted polymer according to the present invention, i.e., comprising (alkyl)acrylic acid or (alkyl)acrylamide moieties wherein at least one of said moieties is grafted with an alkylphenol or with an alkoxylated alkylphenol.

Yet another object of the present invention is a method of the preparation of a product usually opaque that becomes transparent under the application of an external parameter, said method comprising the steps of:
dispersing at least one liquid crystal in a grafted polymer according to the present invention (i.e. comprising (alkyl) acrylic acid or (alkyl)acrylamide moieties wherein at least one of said moieties is grafted with an alkylphenol or with an alkoxylated alkylphenol), thereby obtaining a dispersion and forming a film with said dispersion.

As used herein, application of an external parameter is to be understood as the implementation of an external source of energy and in particular: an electric field (applied potential difference), a temperature variation, a natural or artificial light flow. Consequently, the present invention also encompasses glazing with optical and/or electro-controllable energetic properties.

PDLC films according to the present invention are particularly suitable for use in soft displays, more luminous, and said displays according to the invention being of simpler technology than classical liquid crystal displays.

PDLC films according to the present invention will have applications in particular in spectacles industry, clock industry, visualization glazing, lighting, optical instrumentation, electronic display, said industries using optical components having very diverse functionalities including but not limited to: a transmission with a wavelength light filtration or a reflection thereof or a controlled attenuation of light flow as it is the case in the field of glazing, —diverse lenses effects in the spectacles or clock industries, —a light diffusion or a birefringence used in certain films used for electronic display.

The present invention also encompasses the use of the grafted polymer according to the invention as a dispersing agent in aqueous and non-aqueous systems.

A grafted polymer according to the present invention has the advantage of occupying a stable position at the interface, producing emulsions with a great stability and comprising droplets with a controllable size distribution. The grafted polymer according to the present invention is particularly suitable for the preparation of stable oil in water and/or water in oil emulsions, wherein flocculation, coagulation and/or coalescence phenomena are avoided.

Grafted polymers according to the present invention are particularly suitable for the preparation of aqueous polymeric dispersions, in particular by emulsion polymerization. Accordingly, the present invention also provides the use of the grafted polymer for the preparation of aqueous dispersions. The aqueous dispersions according to the present invention are particularly suitable for the formulation of paints, protective coatings, in the formulation of paper coatings, in the formulation of binders for textiles or non-woven materials. Aqueous dispersions according to the present invention are particularly useful as binders for cements. Aqueous dispersions according to the present invention are also useful in the formulation of polymers used for leather treatment.

The present invention therefore comprises the use of the grafted polymer or aqueous dispersions according to the present invention in the formulation of films, paints or protective coatings. The films, paints or protective coatings prepared using the grafted polymers according to the present invention have particularly improved esthetical properties such as an improved shinning, and an enhanced color resistance to outdoor conditions. The paints prepared using the grafted polymers according to the present invention are particularly resistant to cracking and outdoor aggressions.

The present invention also comprises the use of the grafted polymer or the aqueous dispersion according to the present invention in the composition of adhesives, in the composition of coatings for paper, and/or in the preparation of binders for printing on textile or non-woven material. The present invention also comprises the use of the grafted polymer or of the aqueous dispersion according to the present invention in the preparation of additives for cements and in the preparation of polymers for leather treatment.

The invention will be more readily understood by reference to the following examples, which are included merely for purposes of illustration of certain aspects and embodiments of the present invention and are not intended to limit the invention.

EXAMPLE

1—Synthesis of a Grafted Polymer According to an Embodiment of the Invention.

Figure 2:
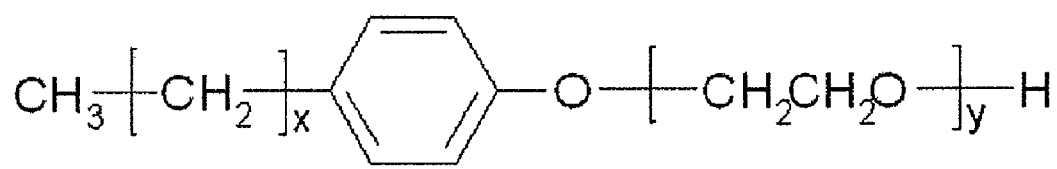
FIG. 2 represents an example of ethoxylated alkylphenol molecules that can be used in the preparation of a grafted polymer according to an embodiment of the invention.

The grafting can be undertaken on any copolymers and homopolymers for which it is possible to modify the skeleton. Non limiting examples of such copolymers and homopolymers are shown in FIG. 1. This grafting can be undertaken by using any surfactant from the alkyls phenols and ethoxylated alkyls phenols families. A non limiting example of such a surfactant is shown in FIG. 2.

In the present example, grafting of nonylphenol ethoylate (NP4), on polyacrylic acid was undertaken. Grafting of the surfactant on the polymer was performed by esterification. The description bellow concerns a particular esterification method, nevertheless other esterification method can be considered. Furthermore the described reaction concerns the grafting of the NP4 surfactant on polyacrylic acid.

10 g of polyacrylic acid (PAA, M=2000 g/mol) were dried in an oven comprising a humidity absorber, at 60° C., during 24 h. Dry PAA was dissolved with 25 g of acetone in a 100 ml flask under mild stirring. 0.4 g of pyridine was added to the mixture. The solution was cooled by bringing the temperature to 10° C., before the gradual addition of 0.6 g of thionyl chloride. The mixture was maintained at 10° C., under mild stirring, during 1 h. 2.5 g of nonylphenol ethoxylate (NP4) were added and stirred during 2 h. The mixture was maintained under stirring and the temperature was brought from 10° C. to 40° C. than maintained during 5 h. The product was extracted by precipitation by gradually adding the mixture in dichloromethane, at ambient temperature, under strong stirring. The solution was filtered and the precipitate was washed with dichloromethane, and dried in an oven at 60° C. during 1 h.

The obtained grafted polymer comprises one or more moieties illustrated hereunder:

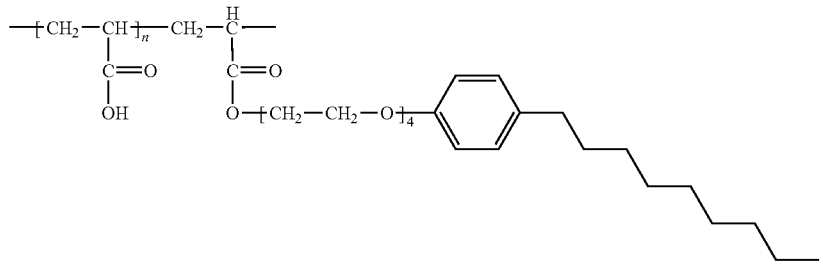

2—Preparation of an Emulsion According to a Particular Embodiment of the Invention.

The surfmer was dissolved in distilled water at 50%. 49% E7 and 2% de nonylphenol ethoxylate (NP9) were added to 49% of the surfmer. The mixture was stirred at 8000 rpm during 30 s than left to rest during 24 h. A stable emulsion, of low polydispersity was obtained. Droplets of 0.1 to 5 μm (preferably from 1 to 3 μm) were formed.

3—Preparation of an Emulsion According to an Embodiment of the Invention.

The surfmer was dissolved in distilled water at 50%. 49% E7 and 2% nonylphenol ethoxylate (NP9) were added to 49% of the surfmer. The mixture was stirred at 12000 rpm during 2 min than allowed to rest during 24 h. A stable emulsion, of low polydispersity was obtained.

4—Preparation of an Emulsion According to a Particular Embodiment of the Invention.

The surfmer was dissolved in distilled water at 50%. 65% E7 and 2.5% de nonylphenol ethoxylate (NP9) were added to 32.5% of the surfmer. The mixture was stirred at 8000 rpm during 30 s than allowed to rest during 24 h. A stable emulsion, of low polydispersity was obtained.

5—Formation of a Film According to a Particular Embodiment of the Invention.

In this example, the emulsion was applied on a conducting substrate, an ITO (indium tin oxide; other conducting films can be used) glass or plastic plate for example. A film was formed on the electrode layer using a spacer.

The film was dried at 40° C. in an oven, with a humidity absorber during a few minutes. The second electrode was applied and maintained with pressure on the film to obtain a good contact.

6—Formation of a Film According to a Particular Embodiment of the Invention.

In this example, the emulsion was applied on a conducting substrate, an ITO (indium tin oxide; other conducting films can be used) glass or plastic plate for example. A film was formed on the electrode layer using a spacer.

The film was dried at 50° C. in an oven, with a humidity absorber during a few minutes. The second electrode was applied and maintained with pressure on the film to obtain a good contact.

7—Formation of a Film According to an Embodiment of the Invention.

In this example, the emulsion was applied on a conducting substrate, an ITO (indium tin oxide; other conducting films can be used) glass or plastic plate for example. A film was formed on the electrode layer using a spacer.

The film was dried at 70° C. in an oven, with a humidity absorber during a few minutes. The second electrode was applied and maintained with pressure on the film to obtain a good contact.

8—Formation of a Film According to a Particular Embodiment of the Invention.

In this example, the emulsion was applied on a conducting substrate, an ITO (indium tin oxide; other conducting films can be used) glass or plastic plate for example. A film was formed on the electrode layer using a spacer.

The film was dried at 110° C. in an oven, with a humidity absorber during a few minutes. The second electrode was applied and maintained with pressure on the film to obtain a good contact.

9—Plastic Films

A 130 μm PET+ITO sheet, containing an ITO conducting film was covered with 20 μm of the composite matrix, than dried at 40° C. in an oven with a humidity absorber during a few minutes. A second 130 μm PET+ITO sheet was applied and maintained with pressure on the first sheet in order to obtain a good contact. Tests conducted with the plastic supports were promising. Under application of an external field the sample switched from an opaque state to a transparent state. One of the advantages of using plastic films, in particular those having a reduced thickness (thin plastic films), is that they permit to prepare complex forms, such as curved forms.

10—Electro-Optical Measurements

The electro-optical performances of PDLC films according to the present invention, or from the prior art, have been evaluated using an electro-optical bench. A He—Ne laser with a 632.8 nm wavelength and a 15 mW power was used. Measurements were conducted at a 1 kHz frequency, using linear steps from 0 to 60V, than from 60V to 0V. The transmittances in the off state and in the on state, the contrast, the threshold and the saturation voltages, were measured.

To evaluate the electro-optical performances of the PDLC films, the transmittance as a function of the applied voltage was measured for different samples. For a film prepared using a sample containing 49.5% E7, 49.5% surfmer and 1% NP9, in proportion by weight of dry film, and dried in oven at 50° C., the transmittance were: $T_{min}=0\%$, $T_{max}=90\%$, $V_{10}=8V$ et $V_{90}=20$ ($T_{min}$ and $T_{max}$ respectively correspond to the minimum and maximum transmittances, $V_{10}$ and $V_{90}$ respectively correspond to the voltage to be applied to obtain 10 and 90% of the maximum transmittance).

What is claimed is:

1. A grafted polymer comprising the following moiety

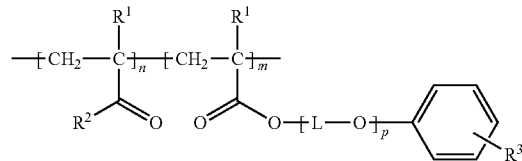

wherein:
p represents an integer greater than 0 and between 0 and 40,
each $R^1$, identical or different, represents a hydrogen atom or a $C_{1-4}$ alkyl group,
each $R^2$, identical or different, represents a OH or $NH_2$ group,
each $R^3$, identical or different, represents a $C_{2-180}$ alkyl group, optionally substituted with one or more $C_{1-4}$ alkyl substituents,
L represents a $C_{1-6}$ alkylene group, and
n and m each independently represent an integer between 1 and 3200, m+n is between 2 and 3500, the ratio between m and n being between 0.01/1 and 0.1/1.

2. A composition suitable for the preparation of liquid crystal films, said composition comprising a liquid crystal dispersed in a grafted polymer according to claim 1.

3. The composition according to claim 2, comprising at least one solvent and optionally at least one surfactant.

4. The composition according to claim 3, wherein said solvent is water.

5. The composition according to claim 2, wherein the liquid crystal is selected from the substituted biphenyls or triphenyls compounds family.

6. The composition according to claim 2, wherein the liquid crystal is in proportion of from 20 to 60% by weight of the composition.

7. The composition according to claim 2, wherein the grafted polymer is in proportion of from 10 to 40% by weight of the composition.

8. The composition according to claim 3, wherein the solvent is in proportion of from 10 to 40% by weight of the composition.

9. The composition according to claim 3, wherein the surfactant is in proportion of from 0 to 10% by weight of the composition.

10. A film formed from the composition according to claim 2.

11. A liquid crystal device comprising a film according to claim 10, said film being provided on a substrate.

12. The device according to claim 11, further comprising a second substrate, wherein the film is provided between both substrates.

13. The device according to claim 11, wherein the substrate is made of glass or plastic.

14. The device according to claim 12, further comprising an electrode layer on each substrate, in an adjacent position to the film.

15. An electro-optical system comprising a PDLC film provided between two electrode layers, said PDLC film comprising one or more liquid crystals forming microdroplets in a polymer matrix, said polymer matrix comprising a grafted polymer according to claim 1.

16. An electro-optical glazing comprising
a PDLC film provided between two transparent plates, said PDLC film comprising one or more liquid crystals forming microdroplets in a polymer matrix, said polymer matrix comprising a grafted polymer according to claim 1.

17. The electro-optical glazing according to claim 16, further comprising an electrode layer on each plate, in an adjacent position to said PDLC film.

18. The electro-optical glazing according to claim 16, wherein said plates are made of glass or plastic.

19. A window comprising a glazing according to claim 16.

20. A door comprising a glazing according to claim 16.

21. A roof comprising a glazing according to claim 16.

22. Glass comprising a glazing according to claim 16.

23. A method for the preparation of a product usually opaque that becomes transparent under the application of an electric field, comprising the step of:
dispersing at least one liquid crystal in a grafted polymer according to claim 1.

24. The grafted polymer according to claim 1, wherein each $R^3$, identical or different, represents a $C_{4-50}$ alkyl group, optionally substituted with one or more $C_{1-4}$ alkyl substituents.

25. The grafted polymer according to claim 1, wherein each $R^3$, identical or different, represents a $C_{6-20}$ alkyl, optionally substituted with one or more $C_{1-4}$ alkyl substituents.

26. The grafted polymer according to claim 1, wherein m+n is between 2 and 150.

27. The grafted polymer according to claim 1, wherein the ratio between m and n is between 0.01/1 and 0.05/1.

28. The composition according to claim 6, wherein the liquid crystal is in proportion of from 20 to 40% by weight of the composition.

* * * * *

UNITED STATES PATENT AND TRADEMARK OFFICE
CERTIFICATE OF CORRECTION

PATENT NO.        : 8,187,493 B2
APPLICATION NO.   : 12/296467
DATED             : May 29, 2012
INVENTOR(S)       : Duponchel et al.

It is certified that error appears in the above-identified patent and that said Letters Patent is hereby corrected as shown below:

Title Page, item (75), Column 1, Line 5, Inventors, "Joël DeConinck" should be changed to --Joël De Coninck--

Column 4, Line 51, "preferably $C_{4-60}$" should be changed to --preferably $C_{4-50}$--

Column 5, Line 22, "acrylamidee moieties" should be changed to --acrylamide moieties--

Column 6, Line 32, "and than adding" should be changed to --and then adding--

Column 10, Line 31, "nonylphenol ethoylate" should be changed to --nonylphenol ethoxylate--

Signed and Sealed this
First Day of January, 2013

David J. Kappos
*Director of the United States Patent and Trademark Office*